United States Patent [19]

Woodside et al.

[11] 4,390,874

[45] Jun. 28, 1983

[54] LIQUID CRYSTAL DISPLAY SYSTEM HAVING IMPROVED TEMPERATURE COMPENSATION

[75] Inventors: Robert H. Woodside, Lubbock, Tex.; Michael J. Drury, Ft. Collins, Colo.

[73] Assignee: Texas Instruments Incorporated, Dallas, Tex.

[21] Appl. No.: 223,664

[22] Filed: Jan. 9, 1981

[51] Int. Cl.³ ............................................... G09G 3/18
[52] U.S. Cl. .................... 340/812; 340/765; 340/784; 350/331 T
[58] Field of Search ............... 340/713, 765, 784, 812; 350/331 T

[56] References Cited

U.S. PATENT DOCUMENTS

| | | | |
|---|---|---|---|
| 3,907,405 | 9/1975 | Fukai et al. | 340/713 X |
| 4,128,311 | 12/1978 | Smith et al. | 350/331 T |
| 4,242,679 | 12/1980 | Morozumi et al. | 340/765 |
| 4,257,045 | 3/1981 | Miles | 340/765 X |
| 4,278,325 | 7/1981 | Kondo et al. | 340/765 X |
| 4,298,866 | 11/1981 | Hodemaekers | 340/713 |
| 4,338,600 | 7/1982 | Leach | 340/812 |

Primary Examiner—David L. Trafton
Attorney, Agent, or Firm—Robert D. Marshall, Jr.; Leo N. Heiting; Melvin Sharp

[57] ABSTRACT

A liquid crystal display system having improved temperature compensation using multiple capacitance ratios for different display temperature ranges. The capacitance of a liquid crystal display segment is measured when preconditioned to a first voltage below the threshold voltage and when preconditioned to a second voltage above the threshold voltage. Separate embodiments are disclosed which sequentially measure the capacitance of a single segment or which simultaneously measures the capacitance of two segments. The magnitude of the second voltage is adjusted to converge the ratio of the measured capacitances to a predetermined value selected according to the display temperature. The on segment and off segment voltages are then formed based on fixed percentages of this second voltage. In a preferred embodiment the second voltage, the on voltage and the off voltage are formed by duty cycle blanking fixed voltages according to a duty cycle blanking count which is adjusted to achieve the selected capacitance ratio.

20 Claims, 6 Drawing Figures

LIQUID CRYSTAL DISPLAY SYSTEM HAVING IMPROVED TEMPERATURE COMPENSATION

CROSS REFERENCE TO RELATED APLICATION

The present invention is an improvement over the temperature compensation technique disclosed and claimed in copending U.S. patent application Ser. No. 168,920, filed July 14, 1980 by Jerald Leach, entitled "Liquid Crystal Display System Having Temperature Compensation" now U.S. Pat. No. 4,338,600 and assigned to the same Assignee.

BACKGROUND OF THE INVENTION

1. Field of the Invention

This invention relates generally to liquid crystal display systems and, more particularly, but not by way of limitation, to a liquid crystal display system having temperature compensation.

2. Prior Art Statement

In general, data processing systems have data processing means which provide output data for display to a user. In previous systems employing a liquid crystal display, operating voltages are typically selected so as to assure a particular optical contrast ratio at a selected design temperature. It has been discovered, however, that the contrast ratio varies as a function of the operating temperature of the display. Thus, the utility of the system will be adversely affected unless temperature compensation is provided. One technique for providing temperature compensation is shown and described in an article entitled "A Novel Method of Temperature Compensation for Multiplexed Liquid Crystal Displays" by C. Hilsum, R. J. Holden, and E. P. Raynes in the July 6, 1978 issue of *Electronics Letters* (G.B.), Vol. 14, No. 14, Pp 430–432, published by the Institution of Electrical Engineers, Savoy Place, London WC2R OBL, England.

SUMMARY OF THE INVENTION

According, it is an object of the present invention to provide a data processing system which has an improved temperature compensated liquid crystal display. In one preferred form of the invention, means are provided for alternately coupling one of the segments of the display to first and second voltages, and temperature compensation means are provided for determining the and ratio of the capacitances of the segment when coupled to the first and second voltages, respectively. The second voltage is then changed to converge the ratio to one of a number of predetermined ratio values. The particular predetermined ratio value employed is selected according to the display temeprature to assure that the new second voltage will provide a more satisfactory contrast ratio. In one other embodiment, the first and second voltages are coupled to first and second segments, respectively, and the temperature compensation means determines the ratio of the respective capacitances. The second voltage is then changed to converge the ratio to the ratio value selected according to the display temperature, so as to provide the desired contrast ratio.

Other objects and advantages of the present invention will be evident from the following detailed description when read in conjunction with the accompanying drawings which illustrate one preferred embodiment thereof.

DESCRIPTION OF THE PREFERRED EMBODIMENTS

Figure 1:
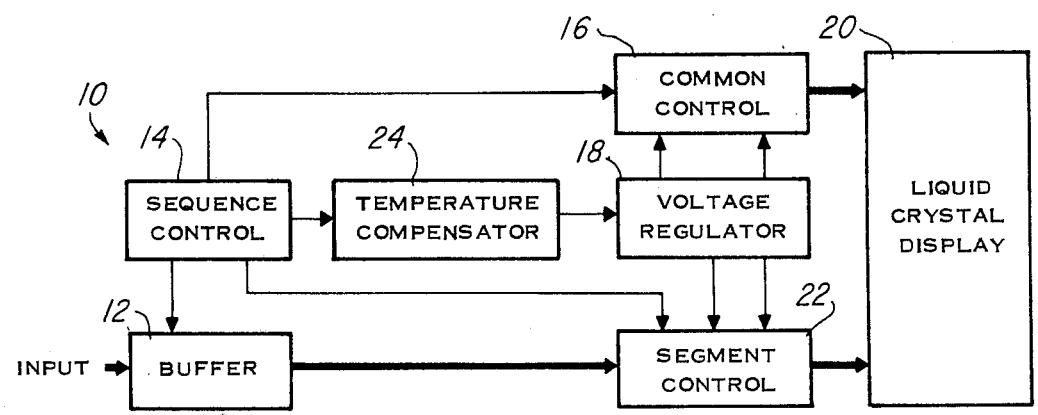
FIG. 1 is a block representation of a liquid crystal display system constructed in accordance with the preferred embodiment of the present invention.

Referring to the drawings in general, and to FIG. 1 in particular, shown therein and referred to by the general reference number 10 is a liquid crystal display system constructed in accordance with the preferred embodiment of the present invention. More particularly, the liquid crystal display system 10 comprises buffer 12, sequence control 14, common control 16, voltage regulator 18, LCD display 20, segment control 22 and temperature compensator 24.

In the preferred form of the liquid crystal display system 10 shown in FIG. 1, a buffer 12 receives input data for display provided by an external data processing system (not shown). A sequence control 14 controls the sequential operation of the liquid crystal display system 10. Periodically during each display time period, the sequence control 14 enables a common control 16 to selectively couple operating voltages provided by a voltage regulator 18 to selected ones of the common lines of the display 20. Generally in synchronization therewith, the sequence control 14 enables the buffer 12 to transfer the display data stored therein to a segment control 22. In response to the display data, the segment control 22 selectively couples operating voltages provided by the voltage regulator 18 to the segment lines of the display 20.

As will be clear to those skilled in the art, the sequence control 14 can be constructed to operate according to any one of several well known timing schemes which facilitate generation of appropriate operating voltage sequences for a selected display 20. In the form shown in FIG. 1, the display system 10 is particularly well suited for use with a liquid crystal type of display 20. In particular, a temperature compensator 24 is provided for monitoring the operating temperature of the liquid crystal display 20 and for interacting with the voltage regulator 18 to vary the effective RMS value of the applied operating voltages to maintain the contrast ratio within a predetermined range. In general, each inactive segment of the liquid crystal display 20 will be coupled to an "off segment" voltage, while each active segment will be coupled to an "on segment" voltage. Typically, the difference between the off and on segment voltages will be selected to provide a desired optical contrast ratio at a particular operating temperature. However, the same voltages may produce significantly different contrast ratios when the temperature of the segments vary from the design temperature. If, on the other hand, the segment voltages can be made to track the temperature-induced shift, the contrast ratio may be maintained relatively stable. For a more detailed discussion of the temperature-dependent response characteristics of liquid crystal displays, as well as one circuit technique for providing temperature compensation, reference may be made to an article entitled "A Novel Method of Temperature Compensation for Multiplexed Liquid Crystal Displays" by C. Hilsum, R. J. Holden, and E. P. Raynes in the July 6, 1978 issue of *Electronics Letters* (G.B.), Vol. 14, No. 14, Pp 430–432, published by the Institution of Electrical Engineers, Savoy Place, London WC2R OBL, England.

Figure 2:
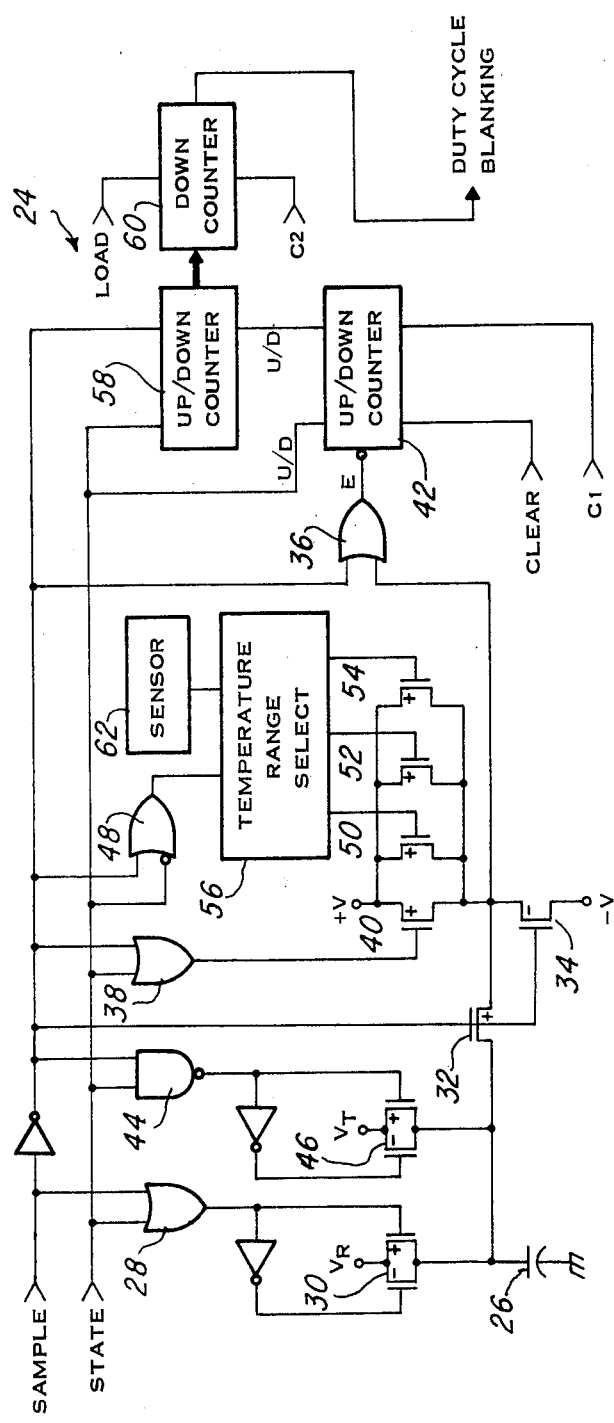
FIG. 2 is a schematic representation of one preferred form of the temperature compensator of the liquid crystal display system of FIG. 1.

In the temperature compensator 24 shown in FIG. 2, a special thermometer segment 26 is provided as an integral portion of the liquid crystal display 20. For the purposes of the present invention, the thermometer segment 26 may be considered to be a lossless capacitor, the capacitance of which is constant below a threshold voltage but steadily increases up to threefold with increasing applied voltage. In addition, the capacitance exhibits approximately the same rate of temperature variation as the rate of contrast ratio variation for optical purposes. The temperature compensator 36 is constructed to take advantage of this phenonmenon by measuring the capacitance of the thermometer segment 38 at selected voltages above and below the threshold voltage.

In the illustrated form, the sequence control 19 provides a SAMPLE signal in each of a logical low and logical high condition during each of a logical low and logical high condition of a STATE signal, thereby defining four operating states of the temperature compensator 24. In the first operating state, when both the SAMPLE and STATE signals are in the logical low condition, an OR gate 28 enables a conventional transfer gate 30 to couple the thermometer segment 26 to a reference voltage $V_R$ provided by the voltage regulator 18 at a selected RMS value below the threshold voltage, e.g. zero (0) volts RMS, to precondition the thermometer segment 26 to a reference capacitance $C_R$. Simultaneously, a transistor 32 is disabled and a transistor 34 is enabled thereby clamping a first input of an OR gate 36 to a logical low potential $-V$. In the second operating state, when the SAMPLE signal is in the logical high condition and the STATE signal is in the logical low condition, the transfer gate 30 and the transistor 34 are each disabled, and the transistor 32 is enabled thereby coupling the thermometer segment 26 to the first input of the OR gate 36. Simultaneously, an OR gate 38 enables a transistor 40, thereby charging the thermometer segment 26 toward a logical high potential $+V$. However, the simultaneous existence of logical low conditions on both inputs to the OR gate 36 and to an up-/down control input, enables an up/down counter 42 to count up, generally in synchronization with a first clock signal C1, from an initial value of zero (0) established in response to a clear signal provided by the sequence control 14 during the first operating state. As soon as the transistor 40 has charged the thermometer segment 26 to a predetermined logical threshold voltage, the OR gate 36 will disable the up/down counter 42, thereby capturing a reference count which is related to the time required to charge the thermometer segment 26 from the reference voltage $V_R$ to the logical threshold voltage.

In the third operating state, when the SAMPLE signal is again in the logical low condition but the STATE signal is in the logical high condition, an AND gate 44 enables a conventional transfer gate 46 to couple the thermometer segment 26 to a test voltage $V_T$ provided by the voltage regulator 18 at a selected RMS value above the threshold voltage, to precondition the thermometer segment 26 to a test capacitance $C_T$. As in the first operating state, the transistor 32 is disabled and the transistor 34 is enabled, again clamping the first input of the OR gate 36 to the logical low potential $-V$. In the fourth operating state, the transfer gate 46 and the transistor 34 are disabled, and the transistor 32 is enabled thereby coupling the first input of the OR gate 36 to the thermometer segment 26. Simultaneously, an OR gate 48 enables one of transistors 50, 52, and 54 selected by temperature range select 56 to charge the thermometer segment 26 toward the logical high potential $+V$. The operation of temperature range select 56 will be more fully explained below. The simultaneous existence of logical low conditions on both inputs to the OR gate 36 and to the logical high condition on the up/down control input, enables the up/down counter 42 to count down from the reference count in synchronization with the clock signal C1. As soon as the selected one of transistors 50, 52, and 54 has charged the thermometer segment 26 to the logical threshold voltage, the OR gate 36 will disable the up/down counter 42, thereby capturing a difference count which is indicative of the difference between the time required to charge the thermometer segment 26 from the reference voltage $V_R$ to the logical threshold voltage and the time required to charge the thermometer segment 26 from the test voltage $V_T$ to the logical threshold voltage.

As will be clear to those skilled in the art, the time required to charge the thermometer segment 26 is related to both the capacitance thereof as well as the level of charging current coupled thereto. Therefore, by constructing each of the transistors 40, 50, 52 and 54 to provide appropriately selected levels of current, it is possible to determine the capacitance of the thermometer segment 26 at the time of measurement. For example, assume that the thermometer segment 26 has been preconditioned by the transfer gate 30 to the capacitance which is characteristic of the particular liquid crystal display 20 when charged to a reference voltage $V_R$ below the threshold voltage. Then, upon coupling the thermometer segment 26 to the potential $+V$ via the transistors 40 and 32, the voltage at the first input of the OR gate 36 will rise at a rate related to the reference current $I_R$ provided by the transistor 40. Thus, the reference count captured by the up/down counter 42 will provide a relative measure of the reference capacitance $C_R$.

Assume now that the thermometer segment 26 has been preconditioned by the transfer gate 46 to the capacitance which is characteristic of the particular liquid crystal display 18 when charged to a selected test voltage $V_T$ above the threshold voltage. Then, upon coupling the thermometer segment 26 to the potential $+V$ via one of the transistors 50, 52 and 54 and transistor 32, the voltage at the first input of the OR gate 36 will rise at a rate related to the test current $I_T$ provided by the selected one of the transistors 50, 52 and 54. Thus, the difference count captured by the up/down counter 42 will be zero (0), if and only if the ratio of the test current $I_T$ provided by the selected one of the transistors 50, 52, 54 to the test capacitance $C_T$ of the thermometer segment 26 is the same as the ratio of the reference current $I_R$ provided by the transistor 40 to the reference capacitance $C_R$ of the thermometer segment 26. Stated in another way, the difference count will be zero (0) if and only if the ratio of the test capacitance $C_T$ of the thermometer segment 26 to the reference capacitance $C_R$ thereof is the same as the ratio of the selected test current $I_T$ to the reference current $I_R$.

Recalling that the test capacitance $C_T$ is related both to temperature and to the voltage $V_T$, it will be evident that changes in temperature as determined from changes in the test capacitance $C_T$ may be compensated for by suitable changes in the test voltage. Thus, changes may be made in the test voltage $V_T$ until the test capacitance $C_T$ is just sufficient so as to be charged by the test current $I_T$ at the same rate as in the reference case. In other words, the ratio fo the test capacitance $C_T$ to the reference capacitance $C_R$ may be converged to the same, predetermined ratio as the test current $I_T$ bears to the reference current $I_R$ by changing the test voltage $V_T$. In the preferred embodiment, the test voltage $V_T$ is changed using a duty cycle blanking technique such a that described in the U.S. Pat. No. 4,257,045, filed Oct. 5, 1978 by L. L. Miles entitled "RMS Voltage Control with Variable Duty Cycle For Matching Different Liquid Crystal Material" and assigned to the Assignee of the present invention.

At the start of each of the first operating states, that is, when the State and Sample signals are both in the logical low condition, an up/down counter 58 is enabled and will either increment or decrement a duty cycle blanking count maintained therein depending upon the polarity of the difference count last captured by the up/down counter 42. For example, the duty cycle blanking count will be decremented if the last difference count was positive, indicating that the test capacitance $C_T$ was too small relative to the reference capacitance $C_R$. The new duty cycle blanking count is thereafter periodically loaded into a down counter 60, and the voltage regulator 18 simultaneously disabled. In synchronization with a second clock signal C2, the counter 60 will decrement the loaded duty cycle blanking count, until an underflow condition occurs. Upon underflow, the down counter 60 will enable the voltage regulator 18. Since the voltage regulator 18 will now be disabled for one less period of the clock signal C2, the RMS values of the various operating voltages, including the test voltage $V_T$, will be increased. Under the influence of the increased test voltage $V_T$, the thermometer segment 26 will exhibit more test capacitance $C_T$.

On the other hand, the duty cycle blanking count will be incremented if the preceding difference count was negative, indicating that the test capacitance $C_T$ was too large relative to the reference capacitance $C_R$. The increase in the duty cycle blanking count will result in a later occurrence of the underflow condition in down counter 60, thereby decreasing the effective RMS value of the various operating voltages, including the test voltage $V_T$. Under the influence of the reduced test voltage $V_T$, the thermometer segment 26 will exhibit less test capacitance $C_T$.

Figure 3:
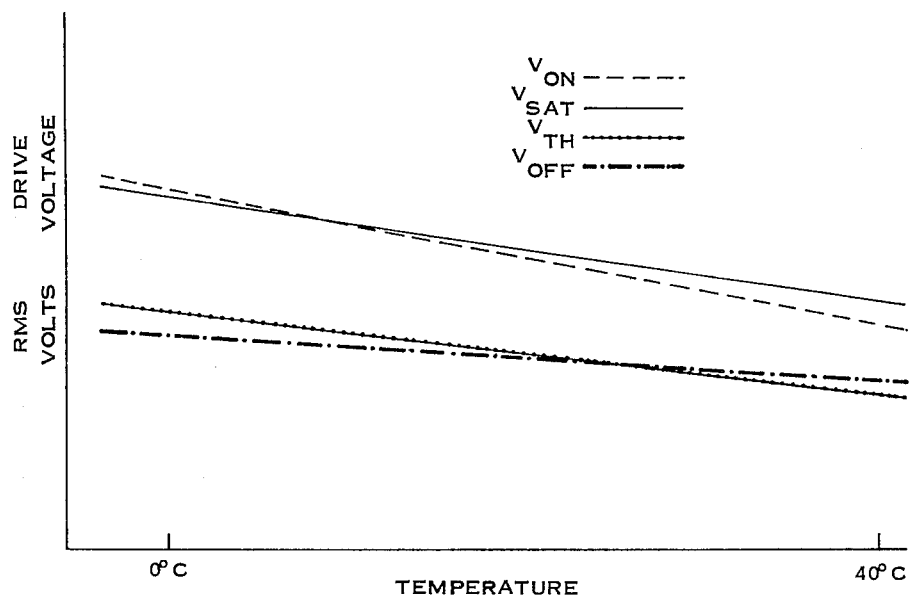
FIG. 3 is a graph illustrating the threshold, saturation, on segment and off segment voltages as a function of temperature according to the teachings of U.S. Pat. No. 4,338,600, filed July 14, 1980 by Jerald Leach, entitled "Liquid Crystal Display System Having Temperature Compensation."

As previously mentioned, temperature range select 56 enables operation of one of the transistors 50, 52 and 54 at the time determined by OR gate 48. It has been found that the temperature change in capacitance of liquid crystal display segments, such as thermometer segment 26 does not exactly track the temperature change in contrast ratio of liquid crystal display segments. This failure of exact temperature tracking is most notable at the temperature extremes. FIG. 3 illustrates a typical result when following the teaching of the above-named U.S. Pat. No. 4,388,600. In FIG. 3 $V_{TH}$ represents the threshold voltage of the liquid crystal display segments and $V_{SAT}$ represents the saturation voltage, that is the voltage at which the required contrast ratio is achieved. Also illustrated in FIG. 3 are $V_{OFF}$ and $V_{ON}$ which are the RMS values of the drive voltages produced by voltage regulator 18 for application to the inactive display segments and the active display segments, respectively. As stated above, the voltages $V_{OFF}$ and $V_{ON}$ are determined by the duty cycle blanking count. For proper operation of the display $V_{OFF}$ should be less than $V_{TH}$ and $V_{ON}$ should be greater than $V_{SAT}$ throughout the operating temperature range. The failure of accurate temperature tracking of the thermometer segment capacitance with the display parameters of interest, $V_{TH}$ and $V_{SAT}$ is clearly illustrated in FIG. 3, in which the temperature compensator employs only a single capacitance ratio. When employing this system with only a single capacitance ratio $V_{OFF}$ typically exceeds $V_{TH}$ at high temperatures and $V_{ON}$ is typically less than $V_{SAT}$ at low temperatures. The failure of accurate temperature tracking can be seen in that the slope of the line for $V_{ON}$ is not equal to the slope of the line for $V_{SAT}$ nor is the slope of the line for $V_{OFF}$ equal to the slope of the line for $V_T$.

Figure 4:
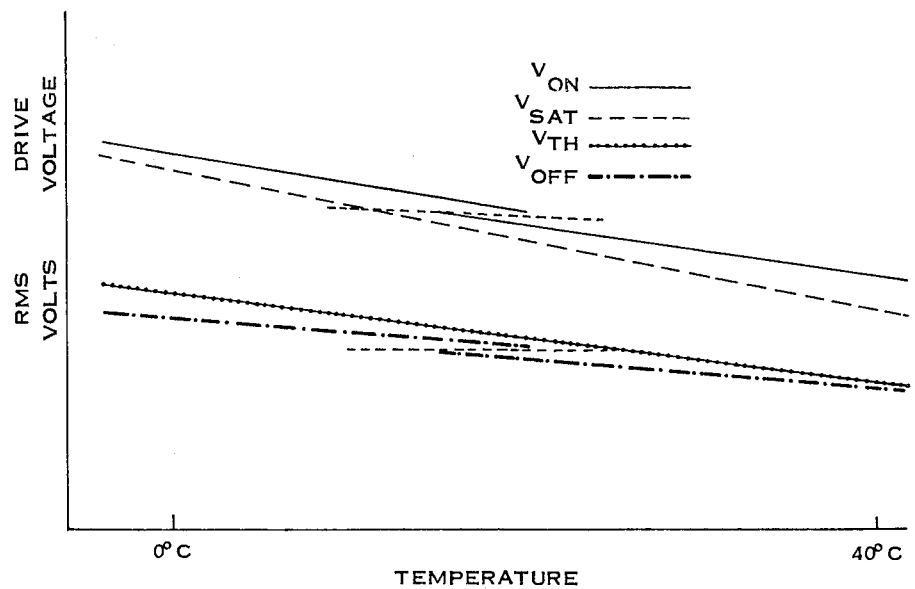
FIG. 4 is a graph illustrating the threshold, saturation, on segment and off segment voltages as a function of temperature for a two ratio embodiment of the present invention.

According to the present invention, one solution to this problem is to employ a multiple capacitance ratio temperature compensator. The operating temperature range is divided into several segments, each temperature range segment having a particular capacitance ratio selected for insuring that $V_{ON}$ is greater than $V_{SAT}$ and that $V_{OFF}$ is less than $V_{TH}$. A system employing two temperature ranges with two capacitance ratios is illustrated in FIG. 4. Note the overlap of capacitance ratios in the region between the two temperature range segments. That is, both $V_{ON}$ and $V_{OFF}$ are multi-valued functions near the intersection between the two temperature range segments. The value taken by the capacitance ratio, and hence the value of the voltages $V_{ON}$ and $V_{OFF}$ generated by voltage regulator 18 depends upon the previous capacitance ratio state. This range overlap is provided to reduce the possibility of repetitive capacitance ratio switching when the display temperature is near the boundary between the two different temperature range segments.

Referring now again to FIG. 2, sensor 62 is disposed at or near display 20 (which includes thermometer segment 26) for generating a signal indicating the display temperature. This signal is applied to temperature range select 56 along with the output of OR gate 48. Temperature range select 56 uses the signal from sensor 62 to determine which of three predetermined operating temperature range segments includes the temperature of display 20. Only one of the transistors 50, 52 and 54 is enabled by OR gate 48 through temperature select 56 depending upon the particular temperature range segment. Each of the transistors 50, 52 and 54 is constructed to provide a test current $I_T$ which causes the test voltage $V_T$ to converge to a value appropriately selected for the corresponding temperature range segment. That is, the test current provided by the selected transistor charges thermometer segment 26 at a rate which causes the duty cycle count stored in up/down counter 58 to converge to a particular value which sets the appropriate voltages $V_T$, $V_{ON}$ and $V_{OFF}$.

Figure 5:
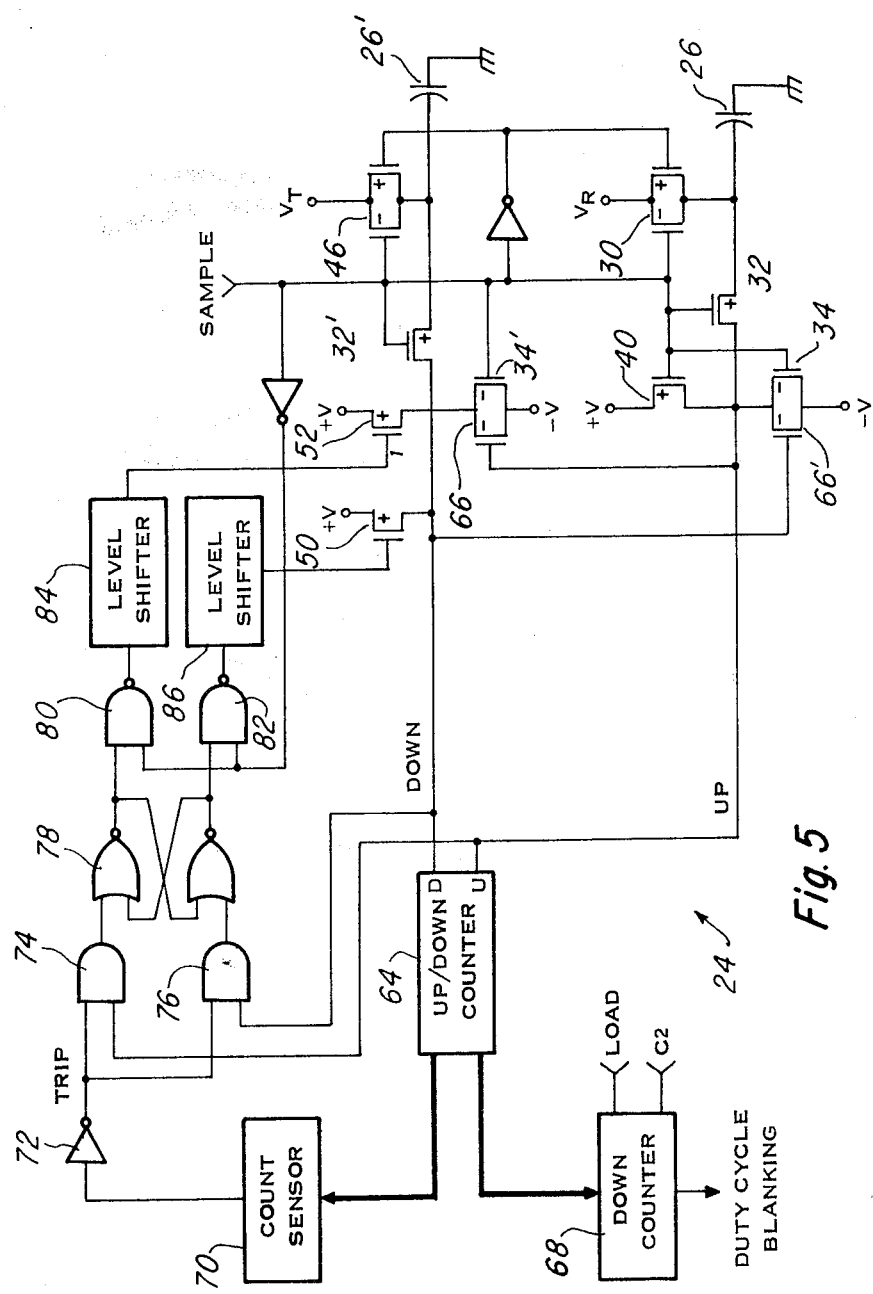
FIG. 5 is a schematic representation of one other preferred form of the temperature compensator of the liquid crystal display system of FIG. 1.

In the temperature compensator 24 shown in FIG. 5, first and second, substantially identical thermometer segments 26 and 26' are provided as an integral portion of the liquid crystal display 20. Recall, however, that the capacitance of each of the thermometer segments 26 and 26' is relatively constant below a threshold voltage, and steadily increases up to threefold with increasing applied voltage. Since the capacitance of each exhibits approximately the same rate of temperature variation as the rate of contrast ratio variation, the temperature compensator 26' may compensate for the latter variation by measuring the capacitance of the thermometer segment 26' at a selected voltage above the threshold voltage relative to the capacitance of the thermometer segment 26 at a voltage below the threshold voltage.

In the illustrated form, the sequence control 14 provides a SAMPLE signal in each of a logical low and a logical high condition, thereby defining two operating states of the temperature compensator 24. In the first operating state, when the SAMPLE signal is in the logical high condition, a conventional transfer gate 30 couples the thermometer segment 26 to a reference voltage $V_R$ provided by the voltage regulator 18 at a selected RMS voltage below the threshold voltage, e.g. zero (0) volts RMS, to precondition the thermometer segment 26 to a reference capacitance $C_R$. The logical high condition of the SAMPLE signal also enables a conventional transfer gate 46 to couple the thermometer segment 26' to a test voltage $V_T$ provided by the voltage regulator 18 at a selected RMS value above the threshold voltage, to precondition the thermometer segment 26' to a test capacitance $C_R$. Simultaneously, transistors 32 and 32' are disabled, and transistors 34 and 34' are enabled, thereby clamping each of the up and down count inputs of an up/down counter 64 to a logical low potential $-V$.

In the second operating state, when the SAMPLE signal is in the logical low condition, the transfer gates 30 and 46 and the transistors 34 and 34' are each disabled, and the transistors 32 and 32' each enabled, thereby coupling the thermometer segments 26 and 26' respectively to the up and down count inputs of the up/down counter 64. Simultaneously, transistors 40 and a selected one of transistors 50 and 52 are enabled, thereby starting each of the thermometer segments 26 and 26' charging toward a logical high potential $+V$. If the first thermometer segment 26 charges to the gate threshold voltage of a transistor 66 before the second thermometer segment 26' charges to the gate threshold voltage of a transistor 66', indicating that the test capacitance $C_T$ is too large, then the transistor 66 will be enabled, clamping the down count input of the up/down counter 64 to the logical low potential $-V$. As soon as the thermometer segment 26 has charged to the logical threshold voltage of the up count input, thus generating an UP signal, the up/down counter 64 will increment a duty cycle blanking count maintained therein. The incremented duty cycle blanking count will thereafter be periodically loaded into a down counter 68, and the voltage regulator 18 simultaneously disabled. In synchronization with a clock signal C2, the down counter 68 will decrement the loaded duty cycle blanking count, until an undeflow condition occurs. Upon underflow, the down counter 68 will enable the voltage regulator 18. Since the voltage regulator 18 will now be disabled for one more period of the clock signal C2, the RMS values of the various operating voltages, including the test voltage $V_T$ will be decreased. Under the influence of the lower test voltage $V_T$, the thermometer segment 26' will exhibit less test capacitance $C_T$.

On the other hand, if the thermometer segment 26' is the first to charge to the gate threshold voltage of the transistor 66', indicating that the test capacitance $C_T$ is too small, the transistor 66' will be enabled, clamping the up clock input to the logical low potential $-V$. As soon as the thermometer segment 26' has charged to the logical threshold voltage of the down count input, thus generating a DOWN signal, the up/down counter 64 will decrement the duty cycle blanking count maintained therein. The decremented duty cycle blanking count will thereafter be periodically loaded into the down counter 68, thereby advancing by one clock cycle the occurrence of the underflow condition and increasing the effective RMS value of the various operating voltages, including the test voltage $V_T$. Under the influence of the increased test voltage $V_T$, the thermometer segment 26 will exhibit more test capacitance $C_T$.

The mechanism for selecting one of the transistors 50 or 52 operates as follows. The duty cycle blanking count in up/down counter 64 is applied to a count sensor 70. As described in detail above, the duty cycle blanking count within up/down counter 64 is a function of the actual temperature of the thermometer segments 26 and 26' and the particular charging transistor 50 or 52 selected. Therefore, the count within up/down counter 64 may be employed in a manner equivalent to sensor 62 illustrated in FIG. 2. Count sensor 70 includes a plurality of invertors and NOR gates for generating a logical low signal when the duty cycle blanking count reaches a predetermined number. After inversion by invertor 72 a TRIP signal is generated having a logical high level when the duty cycle blanking count reaches the predetermined number sensed by state sensor 70. This TRIP signal is applied to one input of each of AND gates 74 and 76. AND gate 74 also has the UP signal applied to its other input. Similarly AND gate 76 has the down signal applied to its other input. The outputs of AND gates 74 and 76 are applied to the latch circuit 78. Latch circuit 78 assumes one of two stable states depending upon the inputs applied via AND gates 74 and 76 in a manner which will be described in further detail above. The two outputs of latch circuit 78 are applied to one input of the respective NAND gates 80 and 82. Also applied to one input of each of NAND gates 80 and 82 is an inverted SAMPLE signal. Depending upon the state of latch counter 78, one of the NAND gates 80 and 82 is enabled during the time of the SAMPLE signal. The output of NAND gate 80 is applied to level shifter 84 and the output of level shifter 84 is applied to the gate of transistor 52. Similarly, the output of NAND gate 82 is applied to level shifter 86 which applies its output to the gate of transistor 50. Thus depending upon the state of latch circuit 78, one of the level shifter 84 or 86 applies a signal to one of the respective transistors 52 and 50 to turn one of these transistors on.

The state of latch circuit 78 is determined as follows. If the duty cycle blanking count stored in up/down counter 64 does not equal the predetermined number sensed by state sensor 70, then the TRIP signal is not produced. Thus both AND gates 74 and 76 are disabled and the state of latch circuit 78 is unchanged. Thus the particular transistor 50 or 52 selected remains the same if the duty cycle blanking count does not equal the count sensed by count sensor 70. In the event that the duty cycle blanking count does equal the predetermined count of count sensor 70, then the TRIP signal is produced. This TRIP signal enables both AND gates 74 and 76. In this state, the state of latch circuit 78 is determined by whether an UP or a DOWN signal is applied to up/down counter 64. This UP or DOWN signal is generated in a manner fully described above. Depending on which of these signals is produced and the current state of latch circuit 78, the latch circuit 78 may either remain unchanged or may change state.

In ordinary operation this system works as follows. Assume that the liquid crystal display including thermometer segments 26 and 26' were initially in a cold environment, such as the left hand portion of the curves in FIG. 4, and then was moved into a warmer environment occupying the right portion of FIG. 4. After such a change the duty cycle blanking count in up/down counter 64 would be incorrect for the new conditions. This would have the effect of making the voltage $V_T$ also incorrect for the new temperature. This would have the effect of preconditioning thermometer segment 26' to a higher test capacitance than that required for a tie in the race during the charging of the thermometer segments 26 and 26'. Under this increased capacitance of thermometer segment 26', the thermometer segment 26 will be charged first thereby generating the UP signal. This UP signal will increment the count within up/down counter 64. Assuming that the change in temperature is a relatively large one, the count in up/down counter 64 will be incremented a number of times. Thus the duty cycle blanking count stored in up/down counter 64 will be continually increased, thereby increasing the blanking time of the various voltages produced by voltage regulator 18 reducing their RMS values. Under this influence the thermometer segment 26' will be preconditioned to a lower and lower test capacitance, thus bringing the charging time for generating the UP and DOWN signals closer and closer together. If, as postulated above, the change in temperature is a great one, then the incrementing of the duty cycle blanking count will continue until the duty cycle blanking count equals the predetermined number sensed by count sensor 70. It is certain that the count will pass through the count sensed by count sensor 70 if the count is changing between a relatively low value to a relatively high value, because the count is always changed one bit at a time. If the UP signal is still produced, that is if the duty cycle blanking count stored within up/down counter 64 has not yet reached its equalibrium value, then the UP signal is enabled by the trip signal through AND gate 74 and is applied to latch circuit 78. This changes the state of latch circuit 78, thereby switching from transistor 52 to transistor 50. This switching then changes the charging rate of thermometer segment 26' and, as illustrated in FIG. 4, shifts the lines of the temperature dependent values $V_{ON}$ and $V_{OFF}$.

As will be understood from the explanation above, each time the temperature of the liquid crystal display changes from one temperature region to another temperature region, the duty cycle blanking count must pass through the predetermined number sensed by count sensor 70, thereby enabling latch circuit 78 to be changed to another state. Because latch circuit 78 may be set in either state when the duty cycle blanking count equals the predetermined count sensed by state sensor 70, this circuit automatically gives the range overlap illustrated in FIG. 4.

Figure 6:
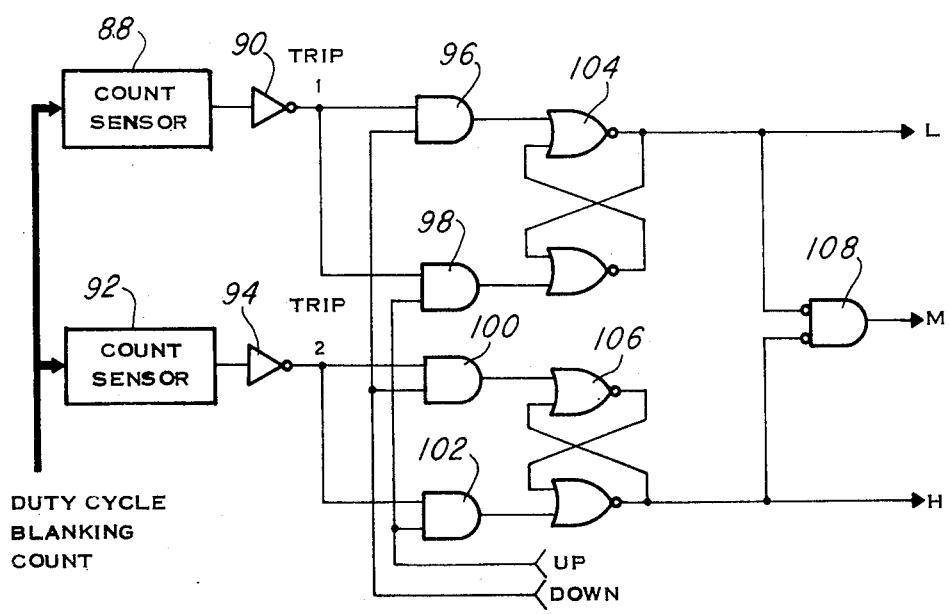
FIG. 6 is a schematic representation of one preferred form of the temperature range select of the liquid crystal display system of FIG. 2.

FIG. 6 illustrates a temperature range select which selects one of three different states, such as temperature range select 56 illustrated in FIG. 2. The duty cycle blanking count is applied to two count sensors 88 and 92. Together count sensor 88 and inverter 90 produces a TRIP 1 signal when the duty cycle blanking count is a first predetermined value. This TRIP 1 signal is applied to one input of both AND gates 96 and 98. Similarly, count sensor 92 together with inverter 94 generates a logical high signal TRIP 2 when the duty cycle blanking count equals a second predetermined number. This signal TRIP 2 is applied to AND gates 100 and 102. The UP signal, generated in the manner described in relation to FIG. 5 is applied to a second input of both AND gates 98 and 102. Similarly, the DOWN signal is applied to a second input of both AND gates 96 and 100. The outputs of AND gates 96 and 98 are applied to latch circuit 104. The outputs of AND gates 100 and 102 are applied to latch circuit 106. In a manner similar to that described above in relation to FIG. 5, the state of latch circuits 104 and 106 are changed when the duty cycle blanking count crosses one of the predetermined numbers sensed by count sensors 88 and 92. When latch circuit 104 is in a first state a L signal is produced. When latch circuit 106 is in a first state a H signal is produced. When neither a L signal nor a H signal is produced gate circuit 108 generates a M signal. These signals may then be applied to NAND gate circuits such as NAND gates 80 and 82 illustrated in FIG. 5 for gating with an inverted SAMPLE signal and thence to level shifters such as level shifters 84 and 86 illustrated in FIG. 5. Thus the circuit in FIG. 6 may be used to generate the signals necessary to energize one of the transistors 50, 52 or 54 illustrated in FIG. 1.

Although the present invention has been described herein in the context of particular embodiments, various changes or modifications may be made in the construction or arrangement of the parts or elements of the disclosed embodiments without departing from the spirit and scope of the invention as set forth in the appended claims.

We claim:

1. A liquid crystal display system comprising:
   a liquid crystal display segment;
   a display drive means for alternatively coupling said display segment to first and second voltages;
   a capacitance ratio selection means, responsive to the temperature of said display segment, for selecting one of a plurality of predetermined ratio values, each predetermined ratio value corresponding to one of a plurality of temperature ranges; and
   a temperature compensation means for determining the ratio of the capacitance of said display segment when coupled to said first voltage to the capacitance of said display segment when coupled to said second voltage, and for changing said second voltage to converge said ratio to said selected predetermined ratio value.

2. The liquid crystal display system claimed in claim 1, wherein said temperature compensation means comprises:

a first charging means for charging said display segment to a predetermined voltage at a predetermined first rate after said display drive means has coupled said display segment to said first voltage;

a second charging means for charging said display segment to a predetermined voltage at a selected one of a a plurality of predetermined second rates corresponding to said selected predetermined ratio value after said display drive means has coupled said display segment to said second voltage;

a timer means for measuring the first charging time of said first charging means and the second charging time of said second charging means; and a converging means for increasing said second voltage when said first charging time exceeds said second charging time and for decreasing said second voltage when said second charging time exceeds said first charging time.

3. The liquid crystal display system claimed in claim 2, wherein:

said display drive means includes a second voltage generator comprising a predetermined voltage source, a counter having a duty cycle blanking count stored therein and a duty cycle blanking means for generating said second voltage by blanking the voltage generated by said predetermined voltage source by a duty cycle ratio corresponding to said duty cycle blanking count;

said capacitance ratio selection means being responsive to said duty cycle blanking count for selecting said predetermined ratio value depending upon said duty cycle blanking count; and said converging means comprises means for decrementing said duty cycle blanking count when said first charging time exceeds said second charging time and means for incrementing said duty cycle blanking count when said second charging time exceeds said first charging time.

4. The liquid crystal display system as claimed in claim 3, wherein said capacitance ratio selection means comprises:

a state counter having a plurality of states, each state corresponding to one of said plurality of predetermined ratio values;

a plurality of count sensors, each responsive to said duty cycle blanking count for generating a coincidence signal when said duty cycle blanking count equals a respective predetermined count, and each associated with two states of said state counter corresponding to adjacent temperature ranges; and a state selector means, responsive to said count sensors and said timer means, for placing said state counter in said state associated with a count sensor generating an enable signal corresponding to the lower temperature range when said first charging time exceeds said second charging time and for placing said state counter in said state associated with a count sensor generating an enable signal corresponding to the higher temperature range when said second charging time exceeds said first charging time.

5. The liquid crystal display system claimed in claim 1, further comprising:

a plurality of liquid crystal display segments;

an off voltage generator means for generating an off voltage having a first predetermined ratio to said second voltage;

an on voltage generator means for generating an on voltage having a second predetermined ratio to said second voltage, said second predetermined ratio being greater than said first predetermined ratio; and a display actuation means for coupling said on voltage to selected ones of said plurality of display segments for actuation thereof and for coupling said off voltage to the other of said plurality of display segments.

6. A display drive circuit for use in a liquid crystal display system having a liquid crystal display segment, said drive circuit comprising:

a display drive means for alternately coupling said display segment to first and second voltages;

a capacitance ratio selection means, responsive to the temperature of said display segment, for selecting one of a plurality of predetermined ratio values corresponding to one of a plurality of temperature ranges; and a temperature compensation means for determining the ratio of the capacitance of said display segment when coupled to said first voltage to the capacitance ratio of said display segment when coupled to said second voltage, and for changing said second voltage to converge said ratio to said selected predetermined ratio value.

7. The liquid crystal display system claimed in claim 6, wherein said temperature compensation means comprises:

a first charging means for charging said display segment to a predetermined voltage at a predetermined first rate after said display drive means has coupled said display segment to said first voltage;

a second charging means for charging said display segment to a predetermined voltage at a selected one of a plurality of predetermined second rates corresponding to said selected predetermined ratio value after said display drive means has coupled said display segment to said second voltage;

a timer means for measuring the first charging time of said first charging means and the second charging time of said second charging means; and a converging means for increasing said second voltage when said first charging time exceeds said second charging time and for decreasing said second voltage when said second charging time exceeds said first charging time.

8. The liquid crystal display system claimed in claim 7, wherein:

said display drive means includes a second voltage generator comprising a predetermined voltage source, a counter having a duty cycle blanking count stored therein and a duty cycle blanking means for generating said second voltage by blanking the voltage generated by said predetermined voltage source by a duty cycle ratio corresponding to said duty cycle blanking count;

said capacitance ratio selection means being responsive to said duty cycle blanking count for selecting said predetermined ratio value depending upon said duty cycle blanking count; and said converging means comprises means for decrementing said duty cycle blanking count when said first charging time exceeds said second charging time and means for incrementing said duty cycle blanking count when said second charging time exceeds said first charging time.

9. The liquid crystal display system as claimed in claim 8, wherein said capacitance ratio selection means comprises:
   a state counter having a plurality of states, each state corresponding to one of said plurality of predetermined ratio values;
   a plurality of count sensors, each responsive to said duty cycle blanking count for generating a coincidence signal when said duty cycle blanking count equals a respective predetermined count, and each associated with two states of said state counter corresponding to adjacent temperature ranges; and
   a state selection means, responsive to said count sensors and said timer means, for placing said state counter in said state associated with a count sensor generating an enable signal corresponding to the lower temperature range when said first charging time exceeds said second charging time and for placing said state counter in said state associated with a count sensor generating an enable signal corresponding to the higher temperature range when said second charging time exceeds said first charging time.

10. The liquid crystal display system claimed in claim 6, further comprising:
   a plurality of liquid crystal display segments;
   an off voltage generator means for generating an off voltage having a first predetermined ratio to said second voltage;
   an on voltage generator means for generating an on voltage having a second predetermined ratio to said second voltage, said second predetermined ratio being greater than said first predetermined ratio; and
   a display actuation means for coupling said on voltage to selected ones of said plurality of display segments for actuation thereof and for coupling said off voltage to the other of said plurality of display segments.

11. A liquid crystal display system comprising:
   a first and second liquid crystal display segments;
   a display drive means for coupling said first display segment to a first voltage and for coupling said second display segment to a second voltage;
   a capacitance ratio selection means, responsive to the temperature of said display segments, for selecting one of a plurality of predetermined ratio values, each ratio value corresponding to one of a plurality of temperature ranges; and
   a temperature compensation means for determining the ratio of the capacitance of said first display segment when coupled to said first voltage to the capacitance of said second display segment when coupled to said second voltage and for changing said second voltage and for changing said second voltage to converge said ratio to said selected predetermined ratio value.

12. The liquid crystal display system claimed in claim 11, wherein said temperature compensator means comprises:
   a first charging means for charging said first display segment to a predetermined voltage at a predetermined first rate after said display drive means has coupled said first display segment to said first voltage;
   a second charging means for charging said second display segment to a predetermined voltage at a selected one of a plurality of predetermined second rates corresponding to said selected predetermined ratio value after said display drive means has coupled said second display segment to said second voltage;
   a charging time comparison means for determining the relationship of the first charging time of the first charging means to the second charging time of the second charging means; and
   a converging means for increasing said second voltage when said first charging time exceeds said second charging time and for decreasing said second voltage when said second charging time exceeds said first charging time.

13. The liquid crystal display system claimed in claim 12, wherein:
   said display drive means includes a second voltage generator comprising a predetermined voltage source, a counter having a duty cycle blanking count stored therein and a duty cycle blanking means for generating said second voltage by blanking the voltage generated by said predetermined voltage source by a duty cycle ratio corresponding to said duty cycle blanking count;
   said capacitance ratio selection means being responsive to said duty cycle blanking count for selecting said predetermined ratio value depending upon said duty cycle blanking count; and
   said converging means comprises means for decrementing said duty cycle blanking count when said first charging time exceeds said second charging time and means for incrementing said duty cycle blanking count when said second charging time exceeds said first charging time.

14. The liquid crystal display system as claimed in claim 13, wherein said capacitance ratio selection means comprises:
   a state counter having a plurality of states, each state corresponding to one of said plurality of predetermined ratio values:
   a plurality of count sensors, each responsive to said duty cycle blanking count for generating a coincidence signal when said duty cycle blanking count equals a respective predetermined count, and each associated with two states of said state counter corresponding to adjacent temperature ranges: and
   a state selector means, responsive to said count sensors and said changing time comparator means, for placing said state counter in said state associated with a count sensor generating an enable signal corresponding to the lower temperature range when said first charging time exceeds said second charging time for placing said state counter in said state associated with a count sensor generating an enable signal corresponding to the higher temperature range when said second charging time exceeds said first charging time.

15. The liquid crystal display system claimed in claim 11, further comprising:
   a plurality of liquid crystal display segments;
   an off voltage generator means for generating an off voltage having a first predetermined ratio to said second voltage;
   an on voltage generator means for generating an on voltage having a second predetermined ratio to said second voltage, said second predetermined ratio being greater than said first predetermined ratio; and a display actuation means for coupling said on voltage to selected ones of said plurality of display segments for actuation thereof and for coupling said off voltage to the other of said plurality of display segments.

16. A display drive circuit for use in a liguid crystal display system having first and second display segments, said display drive circuit comprising:
a display drive means for coupling said first display segment to a first voltage and for coupling said second display segment to a second voltage;
a capacitance ratio selection means, responsive to the temperature of said display segments, for selecting one of a plurality of predetermined ratio values, each ratio value corresponding to one of a plurality of temperature ranges; and
a temperature compensation means for determining the ratio of the capacitance of said first display segment when coupled to said first voltage to the capacitance of said second display segment when coupled to said second voltage and for changing said second voltage and for changing said second voltage to converge said ratio to said selected predetermined ratio value.

17. The liquid crystal display system claimed in claim 16, wherein said temperature compensator means comprises:
a first charging means for charging said first display segment to a predetermined voltage at a predetermined first rate after said display drive means has coupled said first display segment to said first voltage;
a second charging means for charging said second display segment to a predetermined voltage at a selected one of a plurality of predetermined second rates corresponding to said selected predetermined ratio value after said display drive means has coupled said second display segment to said second voltage;
a charging time comparison means for determining the relationship of the first charging time of the first charging means to the second charging time of the second charging means; and
a converging means for increasing said second voltage when said first charging time exceeds said second charging time and for decreasing said second voltage when said second charging time exceeds said first charging time.

18. The liquid crystal display system claimed in claim 17, wherein:
said display drive means includes a second voltage generator comprising a predetermined voltage source, a counter having a duty cycle blanking count stored therein and a duty cycle blanking means for generating said second voltage by blanking the voltage generated by said predetermined voltage source by a duty cycle ratio corresponding to said duty cycle blanking count;
said capacitance ratio selection means being responsive to said duty cycle blanking count for selecting said predetermined ratio value depending upon said duty cycle blanking count; and
said converging means comprises means for decrementing said duty cycle blanking count when said first charging time exceeds said second charging time and means for incrementing said duty cycle blanking count when said second charging time exceeds said first charging time.

19. The liquid crystal display system as claimed in claim 18, wherein said capacitance ratio selection means comprises:
a state counter having a plurality of states, each state corresponding to one of said plurality of predetermined ratio values;
a plurality of count sensors, each responsive to said duty cycle blanking count for generating a coincidence signal when said duty cycle blanking count equals a respective predetermined count, and each associated with two states of said state counter corresponding to adjacent temperature ranges; and
a state selector means, responsive to said count sensors and said charging time comparison means, for placing said state counter in said state associated with a count sensor generating an enable signal corresponding to the lower temperature range when said first charging time exceeds said second charging time and for placing said state counter in said state associated with a count sensor generating an enable signal corresponding to the higher temperature range when said second charging time exceeds said first charging time.

20. The liquid crystal display system claimed in claim 19, further comprising:
a plurality of liquid crystal display segments;
an off voltage generator means for generating an off voltage having a first predetermined ratio top said second voltage;
an on voltage generator meams for gemerating an on voltage having a second predetermined ration to said second voltage, said second predetermined ration being greater than said first predetermined ratio; and
a display actuation means for coupling said on voltage to selected ones of said plurality of display segments for actuation thereof and for coupling said off segment voltage to the other os said plurality of display segments.

* * * * *